(No Model.)
J. B. UNDERWOOD.
EXTENSION CHAIN ATTACHMENT FOR BIRD CAGES.
No. 362,127. Patented May 3, 1887.
Fig. 1.
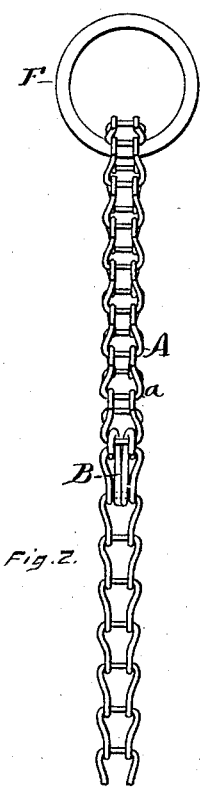
Fig. 2.
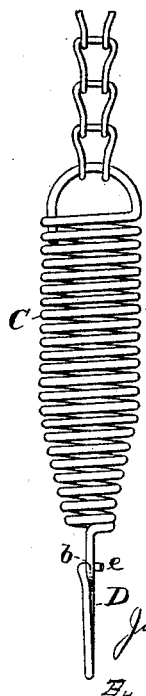
Witnesses.
John Edwards Jr.
W. H. Whiting.
Inventor.
Judson B. Underwood.
By James Shepard
Atty.

UNITED STATES PATENT OFFICE.

JUDSON B. UNDERWOOD, OF NEW HAVEN, ASSIGNOR OF ONE-HALF TO THE HOUSATONIC BRASS CORPORATION, OF DERBY, CONNECTICUT.

EXTENSION-CHAIN ATTACHMENT FOR BIRD-CAGES.

SPECIFICATION forming part of Letters Patent No. 362,127, dated May 3, 1887.

Application filed May 20, 1886. Serial No. 202,747. (No model.)

*To all whom it may concern:*

Be it known that I, JUDSON B. UNDERWOOD, a citizen of the United States, residing at New Haven, in the county of New Haven and State of Connecticut, have invented certain new and useful Improvements in Extension-Chain Attachments for Bird-Cages, of which the following is a specification.

My invention relates to an improvement in extension-chain attachments for bird-cages; and the object of my invention is to provide a chain with attachments whereby the cage may be conveniently and securely hung at any desired height, according to the length of chain used.

In the accompanying drawings, Figure 1 is a side elevation of my improvement, and Fig. 2 is a front elevation of the same.

I form the chain A of any required length, preferably with U-shaped links, which are broadened at their base $a$ to receive the hook B, which hook is attached to the upper end of said chain. At the lower end of this chain I attach the coil-spring C, which is preferably made conical at its lower end. The wire is bent downward from the last coil at the lower end of the spring and formed into an eye or loop, D. There is a short straight portion which constitutes the shank of the loop, then the wire is bent to one side, as at $b$, and around into a loop. The free end of the loop has a short hooked bend in it for embracing or hooking upon the wire at the bent junction $b$ of the loop and its shank. The loop is also so formed that the elasticity of the wire has a constant tendency to hold the free end of the loop against said bend $b$, thereby forming said end into the spring-catch $e$.

It will be seen that this holding-loop D, with the spring-catch $e$, furnishes a convenient holder for the bird-cage, and when the same is attached thereto it will be safely held against any liability to removal from sudden shock.

For convenience in hanging the chain to the hook in the ceiling or otherwise, I have provided the sliding ring F, through which the hook end of the chain A is passed, and by means of the hook B engaging with one of the links in the chain A the cage may be held at any desired position.

I am aware that a prior patent shows a spring for a bird-cage with a semicircular loop at the lower end of the spring, the same being bent from the lower coil at one side, and having a notch filed in the wire at the free end of the loop for engaging the inside of the lower coil at a point opposite the other end of said loop, and the same is hereby disclaimed.

I claim as my invention—

1. In an extension-chain attachment for bird-cages, the spring C, and holding-loop D, having the bend $b$, and the spring-catch $e$, hooked over said bend, substantially as described, and for the purpose specified.

2. The combination of the chain A, provided with the hook B, and sliding ring F, through which one end of the chain is passed, the spring C, holding-loop D, and spring-catch $e$, substantially as described, and for the purpose specified.

JUDSON B. UNDERWOOD.

Witnesses:
 WALTER HURST,
 J. M. FORDHAM.